US011287040B2

(12) United States Patent
King et al.

(10) Patent No.: US 11,287,040 B2
(45) Date of Patent: Mar. 29, 2022

(54) EXTRUSION RESISTANT GASKET

(71) Applicant: Dana Automotive Systems Group, LLC, Maumee, OH (US)

(72) Inventors: Daniel King, Danville, KY (US); Martin Mockenhaupt, Buffalo Grove, IL (US); Curtis Widlock, Downers Grove, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 169 days.

(21) Appl. No.: 16/531,634

(22) Filed: Aug. 5, 2019

(65) Prior Publication Data

US 2020/0049254 A1 Feb. 13, 2020

Related U.S. Application Data

(60) Provisional application No. 62/716,515, filed on Aug. 9, 2018.

(51) Int. Cl.
*F16J 15/08* (2006.01)

(52) U.S. Cl.
CPC .................................. *F16J 15/0881* (2013.01)

(58) Field of Classification Search
CPC .... F16J 15/00; F16J 15/02; F16J 15/46; F16J 15/18; F16J 15/06; F16J 15/08; F16J 15/0818; F16J 15/0881; F16J 15/0887; F16J 15/0893; F16J 15/10; F16J 15/102; F16J 15/104; F16J 15/12; F16J 15/121; F16J 15/122; F16J 15/123
USPC .......................................................... 277/643
See application file for complete search history.

(56) References Cited

U.S. PATENT DOCUMENTS

| | | | | |
|---|---|---|---|---|
| 5,362,074 A * | 11/1994 | Gallo | F02F 11/002 | 277/592 |
| 5,468,003 A * | 11/1995 | Staab | F02F 11/002 | 277/592 |
| 5,788,247 A * | 8/1998 | Tensor | F16J 15/122 | 277/591 |
| 8,550,469 B2 * | 10/2013 | Virgin | B32B 3/08 | 277/654 |
| 9,657,840 B2 * | 5/2017 | West | F16J 15/128 | |
| 10,094,473 B2 * | 10/2018 | Imai | F16J 15/0825 | |
| 2010/0207334 A1 * | 8/2010 | Virgin | B32B 3/08 | 277/654 |
| 2015/0115548 A1 * | 4/2015 | Waterland, III | F16J 15/122 | 277/654 |
| 2018/0119855 A1 * | 5/2018 | Bond | F16L 23/18 | |

* cited by examiner

*Primary Examiner* — Nathan Cumar
(74) *Attorney, Agent, or Firm* — Marshall & Melhorn, LLC

(57) ABSTRACT

An extrusion resistant gasket may have a metallic core having a first side and a second side. The metallic core may have a plurality of alternating domes and valleys integrally formed therein. The domes and valleys do not have perforations through the core. The gasket may also have a non-metallic facing material on at least one of the sides of the metallic core. The facing material may have a contact surface and an inner surface. The domes or valleys do not extend through the contact surface.

13 Claims, 5 Drawing Sheets

58 40 52 70 42 72 74 76 48 50 66 36 62 44 54 60 68 A 38 56 B

EXTRUSION RESISTANT GASKET

CROSS REFERENCE TO RELATED APPLICATIONS

The present application claims the benefit of U.S. Provisional Patent Application No. 62/716,515 filed on Aug. 9, 2018, which is incorporated herein by reference in its entirety.

FIELD

The present disclosure relates to an extrusion resistant gasket and method of making the same.

BACKGROUND

Gaskets are well-known devices for sealing an engine head and an engine block of an internal combustion engine. The gaskets may be comprised of a metal core combined with a non-metal facing. A significant problem associated with these gaskets is that the non-metal facing can delaminate, or be separated from, the metal core. The delamination can be caused by the heat cycles and mechanical vibration of the engine breaking down the adhesive used to connect the facing with the core. Another problem associated with these gaskets is that while the facing material may be effective for sealing, it often does not lend itself to adhesive bonding. As a result, the adhesive does not secure the facing which can extrude from between the block and head interface, causing leaks.

The prior art has attempted to use tangs or barbs to mechanically grab the facing material to secure it in place. These tangs or barbs, however, are created by punching through the core. These holes in the core are failure modes for the gasket which weaken the core and often permit fluid to leak through the gasket. The barbs have also been found to be almost razor sharp which make them impractical to handle by workers.

In view of the disadvantages associated with the prior art, it would be advantageous for a gasket to remain in place, to not leak fluids, and for it to be easy to handle.

SUMMARY

An extrusion resistant gasket may have a metallic core having a first side and an opposing second side. The metallic core may have a plurality of alternating domes and valleys integrally formed therein. The domes and valleys do not perforate the core. The gasket may also have a non-metallic facing material on at least one of the sides of the metallic core. The facing material may have a contact surface and an inner surface. The inner surface is interlocked with the metallic core. The domes or valleys do not extend through the contact surface. The gasket may also include an adhesive disposed between the metallic core and the inner surface of the facing material on at least one of the sides of the metallic core.

BRIEF DESCRIPTION OF THE DRAWINGS

The above, as well as other advantages, will become readily apparent to those skilled in the art from the following detailed description when considered in the light of the accompanying drawings in which.

DETAILED DESCRIPTION

It is to be understood that the device and method described herein may assume various alternative orientations and step sequences, except where expressly specified to the contrary. It is also to be understood that the specific devices and processes illustrated in the attached drawings, and described in the following specification are simply exemplary embodiments of the concepts herein. Hence, specific dimensions, directions or other physical characteristics relating to the embodiments disclosed are not to be considered as limiting, unless expressly stated otherwise.

Figure 1:
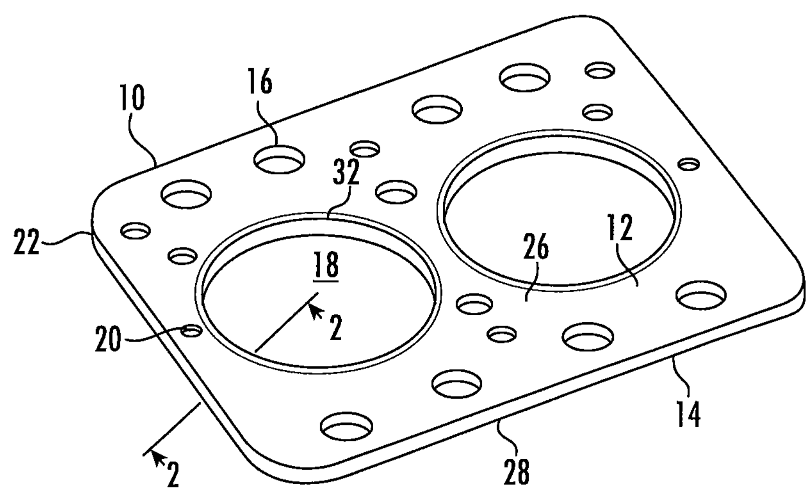
FIG. 1 is a schematic, perspective view of one embodiment of a gasket.

Turning to FIG. 1 one embodiment of a gasket 10, such as a cylinder head gasket is depicted. The gasket 10 may be located between the head and block of an internal combustion engine (not shown) to seal the intersection. The gasket 10 may have a plurality of openings spaced apart from one another and extending from an upper surface 12 to a lower surface 14 of the gasket 10. The openings may be of various shapes and sizes with locations throughout the gasket 10. The openings may comprise fluid openings 16, combustion openings 18, and openings 20 for mechanical fasteners. However, one of ordinary skill in the art would appreciate that the openings may be located, sized, and shaped for any suitable purpose.

The upper surface 12 and the lower surface 14 may be substantially planar and parallel with one another. The two surfaces 12, 14 may define a substantially constant thickness between them. The surfaces 12, 14 may be bounded by a perimeter portion 22. While one embodiment of a gasket 10 with one shape, size and number of the above-mentioned openings 16, 18, 20 is depicted in FIG. 1, gaskets of other dimensions and number of the above-mentioned openings are permissible.

Figure 2:
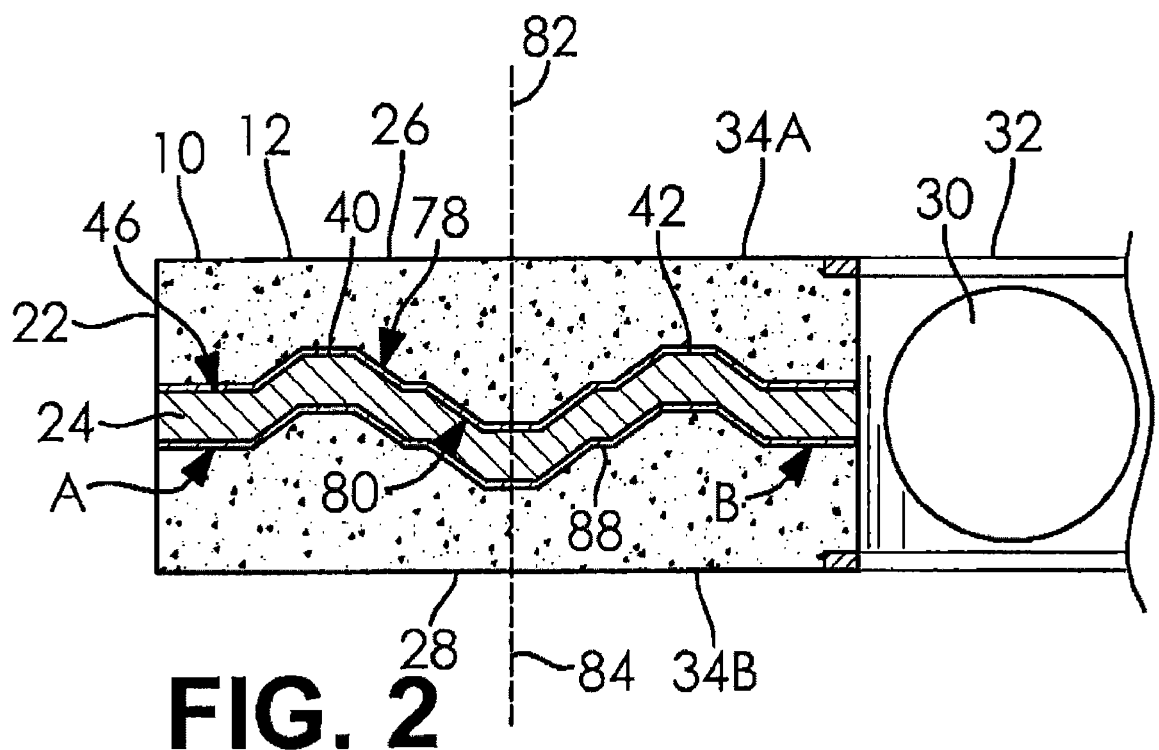
FIG. 2 is a cross-sectional schematic side view through line 2-2 of FIG. 1.

Turning now to FIG. 2, one embodiment of a schematic cut away view of the gasket 10 of FIG. 1 is depicted. As shown in FIG. 2, the gasket 10 may be comprised of at least one facing layer and a core layer 24. Preferably, the gasket 10 may be comprised of an upper facing layer 26 and a lower facing layer 28.

As best seen in FIG. 2, each of the combustion openings 18 may have a sealing element or a fire ring 30 provided therein. The ring 30 is positioned at the periphery of each of the combustion openings 18 and is held in place using a fire ring holder 32. Depending on the internal combustion engine or application, the fire ring 30 may be flat, round, elliptical, or the like. In an embodiment, the fire ring 30 is attached to the gasket via a metallic flange.

The facing layers 26, 28 may be comprised of the same material. In a preferred embodiment, the material may be a non-metallic material, such as graphite. In an embodiment, each facing layer 26, 28 is unitary, one piece and integrally formed. However, one of ordinary skill in the art would appreciate that the facing layers 26, 28 may be made from other suitable materials.

Graphite has been found to advantageously conduct heat from the combustion opening 18 and the gasket components adjacent the opening (e.g., the fire ring and fire ring holder).

It is preferable to make the facing layers 26, 28 as thin as possible to reduce cost and materials usage, and increase the resistance to fluid or gas leakage. In one embodiment, the facing layers 26, 28 may each have a thickness of approximately 0.01 inches (0.25 mm) up to approximately 0.045 inches (1.14 mm).

As can be appreciated from the figures, the facing layers 26, 28 may have the same shape and thickness as one another. Preferably, the facing layers 26, 28 extend continuously in an uninterrupted fashion from their contact surfaces 34A, 34B, which comprise their outermost surfaces, to the core layer 24. It can be appreciated that the contact surfaces 34A, 34B are the same as the upper and lower surfaces 12, 14 of the gasket 10 described above in FIG. 1.

As shown in FIG. 2, the core layer 24 may be located between the upper facing layer 26 and the lower facing layer 28. The core layer 24 is sandwiched and effectively encapsulated within the upper and lower facing layers 26, 28. Thus, no feature or part of the core layer 24 extends through the contact surfaces 34A, 34B of the facing layers 26, 28.

The core layer 24 has an upper surface 36 and a lower surface 38. A constant thickness is defined between the two surfaces. The core layer 24 may have a thickness between approximately 0.05 inches (0.13 mm) and 0.25 inches (6.35 mm). The core layer 24 is preferably constructed of metal, such as stainless steel. However, one of ordinary skill in the art would appreciate that the core layer 24 may also be constructed of other suitable materials.

Figure 3:
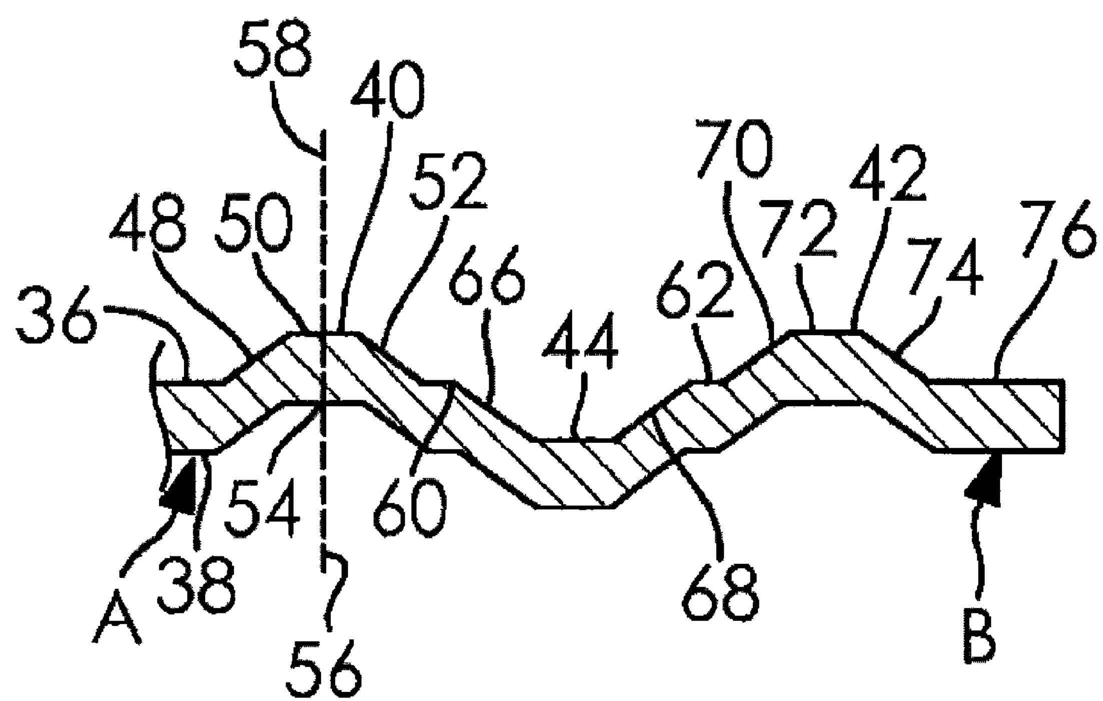
FIG. 3 is a cross-sectional schematic side view through line 2-2 of FIG. 1 of a core layer of the gasket.
Figure 4:
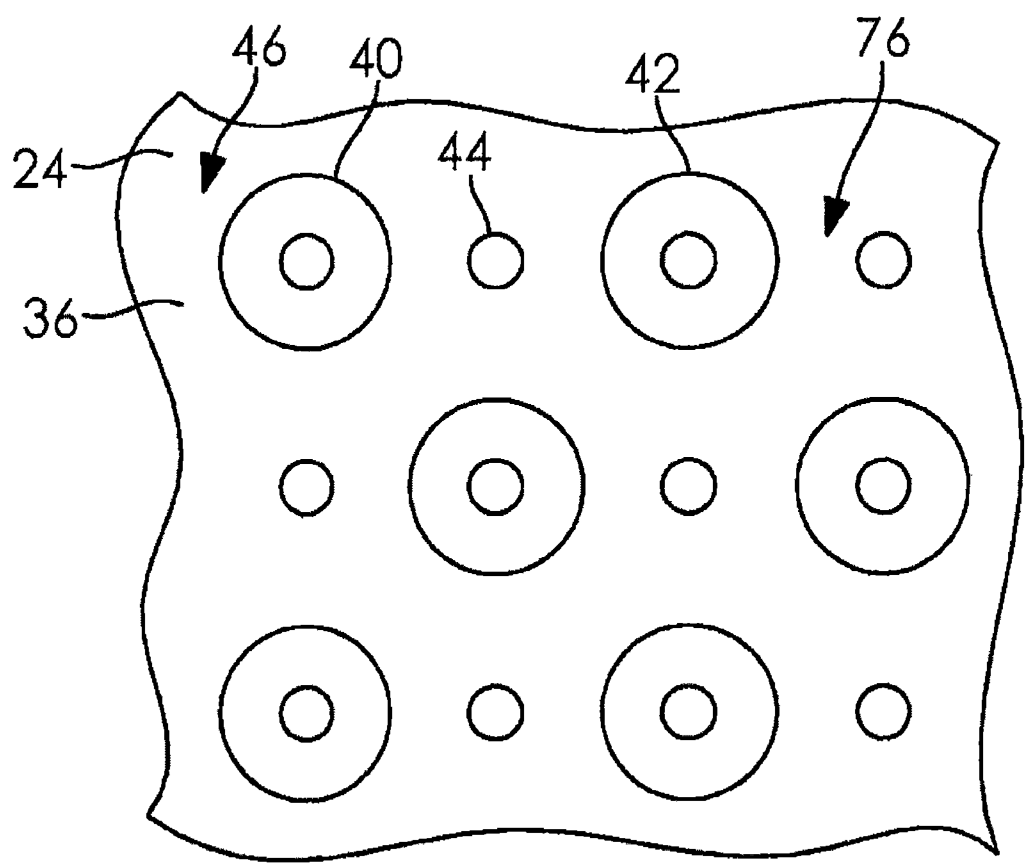
FIG. 4 is a schematic plan view of a portion of the core layer of the gasket.

Looking now at FIGS. 2-4, the core layer 24 has an array of alternating domes and valleys. FIGS. 2 and 3 depict a first dome 40 and a second dome 42 with a valley 44 between the domes 40, 42, as viewed from the upper surface 36. From the side, the domes 40, 42 and valley 44 may take on a sinusoidal wave length appearance.

Adjacent to the domes 40, 42, the core layer 24 may define planar portions. For example, in Area A, a first planar portion 46 of the core layer 24 is provided. The first planar portion 46 comprises the upper and the lower surface 36, 38 of the core layer 24. The two surfaces 36, 38 are generally parallel and planar to one another and define a constant thickness between them, with some small thinning of areas due to the forming of the domes 40, 42.

As best shown in FIG. 3 and as a non-limiting example, a first side 48 of the first dome 40 extends radially upwardly from the upper surface 36 to a crest portion 50. A second side 52 of the first dome 40 extends radially downwardly from the crest portion 50. The first and second sides 48, 52 define a hemispherical shape.

As best shown in FIG. 3 and as a non-limiting example, the upward extension of the core layer 24 for the first dome 40 on the upper surface 36 results in a corresponding valley 54 on the lower surface 38. An axis 56 of the valley 54 is axially and radially aligned with an axis 58 of the first dome 40, In some embodiments, the result is the domes are symmetrical.

The second side 52 transitions into a first side 60 of an upper surface valley 44 that extends radially downward, opposite the first dome 40, from a transition portion 62. Since the first dome 40 and upper surface valley 44 are hemispherical, the transition portion 62 may be circumferential. The transition portion 62 may be like a continuous rim. The rim comprises an axially inward extending portion.

As best shown in FIG. 3 and as a non-limiting example, the upper surface valley 44 extends radially below the lower surface 38 of the first planar portion A of the core layer 24.

Based on the above and the figures, it can be readily appreciated that the upper surface valley 44 on one side of the core layer 24 forms a lower surface dome 44 directly radially opposite on the other side of the core layer 24.

As best shown in FIG. 3 and as a non-limiting example, the first side 60 of the upper surface valley 44 extends to a concave basin 66. A second side 68 of the upper surface valley 44 extends from the basin 66 to the transition portion 62. A first side 70 of the second dome 42 extends from the transition portion 62 to a crest portion 72.

The crest portion 72 of the second dome 42 is parallel and coplanar with the crest portion 50 of the first dome 40. A second side 74 of the second dome 42 extends radially downward to Area B, which is a second planar portion 76 comprising the upper and lower surface 36, 38 of the core layer 24. The first and second planar portions 36, 38 in Area A and B are coplanar with one another.

In one embodiment, the second side 52 of the first dome 60 and the first side 70 of the second dome 42 form a truncated cone 78. The first side 60 of the upper surface valley 44 and the second side 68 of the upper surface valley 44 form a lower cone 80. The axis 82, 84 of the two cones 78, 80 are axially and radially aligned with one another.

Preferably, all of the domes and valleys on the core layer 24 have the same shape, and size as one another. The domes and valleys may be aligned with one another and at equal intervals from one another. The array of cones and valleys continues in this fashion across the core layer 24. The density of the domes and valleys can vary across the core layer 24. In one embodiment, the density may be approximately 50-250 domes or valleys per square inch on a single side of the core layer 24.

In some embodiments, the core layer 24 is unitary, one piece and integrally formed. Thus, except for the above-mentioned combustion, fastener and fluid openings, 14, 18, 20, the core layer 24 extends continuously and uninterrupted from the perimeter portion 22 and the upper and lower surfaces 12, 14. The core layer 24 does not have any openings created from the domes or valleys, or openings created by any other facing layer retention feature. The core layer 24 is fluid tight except for the specific fluid, combustion and bolt holes 16, 18, 20 formed therethrough. These structures do not change the fluid tight definition of the core layer 24 as used herein as they are intentionally located to permit fluids through the gasket 10 whose openings the gasket 10 is designed to seal.

Figure 5:
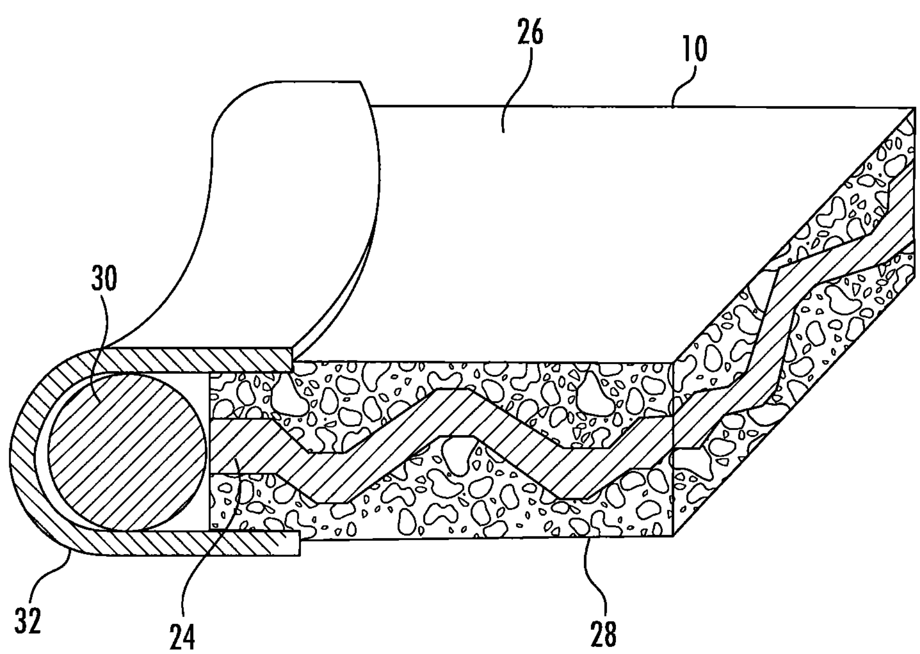
FIG. 5 is a partial assembled view of the gasket illustrated in FIGS. 1-4.

Turning now to FIG. 5, a partial assembled view of the gasket 10 illustrated in FIGS. 1-4 is depicted. In this embodiment, the upper facing layer 26 is pressed onto the core layer 24 such that the material is moved, or displaced, by the domes 40, 42 into the areas of the valleys 44, 54. Thus, the inner surfaces of the facing layers 26, 28 assumes a complimentary shape to the domes 40, 42 and valleys 44, 54 of the core layer 24. The facing layers 26, 28 may thin above the domes 40, 42 and thickens in the valleys 44, 54 while maintaining a planar contact surface 34A, 34B.

Combining the facing layers 26, 28 with the core layer 24 may be done by a platen, a roller combiner, or similar structures. An adhesive 88, such as a thermosetting adhesive or a pressure-sensitive adhesive, may be located between the facing layers 26, 28 and the core layer 24 to increase adhesion between the two. The adhesive 88 may be such as nitrile, phenolic, silicone and acrylic materials. The adhesive 88 aids in preventing the domes and valleys from perforating the core layer 24.

The combination of valleys 44, 54 and domes 40, 42 may lock the facing layers 26, 28 in place and prevents their lateral movement, or extrusion. The domes 40, 42 and valleys 44, 54 also act as stoppers that prevent the facing layers 26, 28 from becoming over-crushed. Thus, the domes 40, 42 and valleys 44, 54 retain the integrity of the facing layers 26, 28 so that their sealing properties can be maintained. The domes 40, 42 and valleys 44, 54 of the core layer 24 provide additional surface area for the adhesives 88 to grab on it.

In view of the maintained integrity and sealing of the facing layers 26, 28, their thickness may be reduced compared with prior art designs, which saves material and money. Gaskets 10 of various thicknesses may be constructed simply by increasing the height of the domes 40, 42.

It is therefore to be understood that the various embodiments described in this specification and as illustrated in the attached drawings are simply exemplary embodiments illustrating the inventive concepts as defined in the claims. As a result, it is to be understood that the various embodiments described and illustrated may be combined to form the inventive concepts defined in the appended claims.

In accordance with the provisions of the patent statutes, the present device and method has been described in what is considered to represent its preferred embodiments. However, it should be noted that the device can be practiced otherwise than as specifically illustrated and described without departing from its spirit or scope.

What is claimed is:

1. An extrusion resistant gasket, comprising:

a metallic core having a first side and an opposing second side, wherein the metallic core has a plurality of alternating domes and valleys integrally formed therein, and wherein the domes and valleys do not perforate the core, wherein said domes are symmetrical, truncated cones;

a non-metallic facing material on at least one of the sides of the metallic core, the non-metallic facing material having a contact surface and an inner surface, wherein the inner surface is interlocked with the metallic core, and wherein the domes and the valleys of the metallic core do not extend through the contact surface; and an adhesive disposed between the metallic core and the inner surface of the non-metallic facing material on at least one of the sides of the metallic core.

2. The extrusion resistant gasket of claim 1, wherein the non-metallic facing material is graphite.

3. The extrusion resistant gasket of claim 1, wherein the metallic core further includes a plurality of planar portions, wherein each of the planar portions comprises the first and second sides of the metallic core.

4. The extrusion resistant gasket of claim 3, wherein a first dome includes a first side and a second side, wherein the first side extends radially upward from the first side of the metallic core to a crest portion and the second side extends radially downward from the crest portion.

5. The extrusion resistant gasket of claim 4, wherein the second side of the first dome is disposed directly adjacent to a first side of a first valley and wherein the first side of the first valley extends radially downward and opposite from the first dome.

6. The extrusion resistant gasket of claim 5, wherein the first valley extends radially below the planar portions of the metallic core.

7. The extrusion resistant gasket of claim 5, wherein the first valley is interposed between the first dome and a second dome.

8. The extrusion resistant gasket of claim 7, wherein an axially extending portion is interposed between the first valley and the second dome.

9. The extrusion resistant gasket of claim 1, wherein the metallic core is unitary and integrally formed.

10. The extrusion resistant gasket of claim 1, wherein the inner surface of the non-metallic facing material has a complimentary shape to at least one of the domes.

11. The extrusion resistant gasket of claim 1, wherein the adhesive is a thermosetting adhesive or a pressure-sensitive adhesive.

12. The extrusion resistant gasket of claim 1, further comprising a plurality of spaced apart openings, wherein at least one of the openings includes a fire ring therein.

13. An extrusion resistant gasket, comprising:

a metallic core having a first side and an opposing second side, wherein the metallic core has a plurality of alternating domes and valleys integrally formed therewith, and wherein the domes and valleys do not perforate the core, wherein said domes are symmetrical, truncated cones, wherein a first surface dome forms a second surface valley;

a non-metallic facing material on at least one of the sides of the metallic core, the non-metallic facing material having a contact surface and an inner surface, wherein the inner surface is interlocked with the metallic core, and wherein the domes and the valleys of the metallic core do not extend through the contact surface; and an adhesive disposed between the metallic core and the inner surface of the non-metallic facing material on at least one of the sides of the metallic core.

* * * * *